(12) United States Patent
Sakakibara et al.

(10) Patent No.: US 7,234,746 B2
(45) Date of Patent: Jun. 26, 2007

(54) STORAGE BOX WITH OPENING/CLOSING MECHANISM

(75) Inventors: Yasuhiro Sakakibara, Aichi-ken (JP); Hiroto Ikuta, Nagoya (JP); Naoki Omatsu, Aichi-ken (JP); Shigeru Yabuya, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 168 days.

(21) Appl. No.: 11/180,908

(22) Filed: Jul. 14, 2005

(65) Prior Publication Data
US 2006/0012202 A1    Jan. 19, 2006

(30) Foreign Application Priority Data
Jul. 16, 2004  (JP)  ............... 2004-210623

(51) Int. Cl.
*B60R 27/00*  (2006.01)
(52) U.S. Cl. ................... 296/24.34; 296/37.8
(58) Field of Classification Search ............... 296/37.8, 296/37.12, 24.34; 220/264, 348, 813
See application file for complete search history.

(56) References Cited

U.S. PATENT DOCUMENTS

| | | | | |
|---|---|---|---|---|
| 1,590,416 | A | * | 6/1926 | Brown ..................... 16/347 |
| 5,639,002 | A | * | 6/1997 | Weitbrecht et al. ......... 224/539 |
| 6,045,173 | A | * | 4/2000 | Tiesler et al. ............... 296/37.8 |
| 6,669,258 | B1 | * | 12/2003 | Kato ......................... 296/1.01 |
| 6,749,079 | B2 | * | 6/2004 | Katagiri et al. .......... 220/345.2 |
| 6,932,402 | B2 | * | 8/2005 | Niwa et al. ............... 296/24.34 |
| 7,063,225 | B2 | * | 6/2006 | Fukuo ......................... 220/264 |
| 7,077,468 | B2 | * | 7/2006 | Maierholzner ......... 297/188.19 |
| 7,125,063 | B2 | * | 10/2006 | Kawamoto et al. ........ 296/37.8 |
| 7,168,750 | B2 | * | 1/2007 | Hutek et al. ............... 296/37.8 |

FOREIGN PATENT DOCUMENTS

| | | |
|---|---|---|
| JP | 02-267038 | 10/1990 |
| JP | 2000-159251 | 6/2000 |
| JP | 2001-180385 | 7/2001 |

* cited by examiner

*Primary Examiner*—Dennis H. Pedder
*Assistant Examiner*—Michael Hernandez
(74) *Attorney, Agent, or Firm*—Posz Law Group, PLC (57) ABSTRACT

The storage box includes an opening/closing mechanism. At a first stage, sliding of a lid relative to a box main body partially opens an opening. At a second stage, pivoting of the lid relative to the box main body fully opens the opening. At a third stage, pivoting of the lid relative to the box main body partially closes the opening. At a fourth stage, sliding of the lid relative to the box main body fully closes the opening. The first elastic member exerts elastic force for sliding the lid at the fourth stage. The second elastic member exerts elastic force for pivoting the lid at the second stage.

10 Claims, 6 Drawing Sheets

STORAGE BOX WITH OPENING/CLOSING MECHANISM

BACKGROUND OF THE INVENTION

The present invention relates to a storage box provided in a vehicle passenger compartment.

Conventionally, storage boxes such as console boxes include a box main body having an opening and a lid for selectively opening and closing the opening. In some of such storage boxes, opening and closing of the box main body with a lid are realized by sliding motion and rotation of the lid (for example, Japanese Laid-Open Patent Publication No. 2000-159251 and Japanese Laid-Open Patent Publication No. 2001-180385). In these storage boxes, opening and closing of the lid is performed manually. Also, some storage boxes are equipped with an electrical driving source such as a motor to open and close the lid (for example, Japanese Laid-Open Patent Publication No. 2-267038).

If opening and closing of the lid is entirely performed manually in a conventional storage box, an operator needs to manipulate the lid when opening or closing the lid. Therefore, differences in the individual physiques and seating positions can force operators to manipulate the lid in an uncomfortable posture. Such storage boxes are therefore not easy to operate. On the other hand, a storage box in which a driving source opens and closes the lid electrically does not force an operator to be in a uncomfortable posture. Thus, such a storage box is easy to operate as compared to a storage box that requires manual operations for opening and closing lid. However, since electricity is required for operating the driving source, the lid cannot be opened or closed when the vehicle electric power source is off. This type of storage box is there not necessarily convenient. Further, a storage box in which the lid is opened and closed electrically has a driving source, which increases the cost (unit price).

SUMMARY OF THE INVENTION

Accordingly, it is an objective of the present invention to provide a storage box having an opening/closing mechanism that facilitates opening and closing operations of a lid without using electricity.

To achieve the foregoing and other objectives and in accordance with the purpose of the present invention, an improved storage box is provided. The storage box includes a box main body having an opening, a lid for selectively opening and closing the opening, an opening/closing mechanism, a first elastic member, and a second elastic member. The opening/closing mechanism implements an opening operation and a closing operation of the lid with respect to the box main body. The opening/closing mechanism implements the opening operation from a fully closed state of the opening through a first stage and a subsequent second stage. At the first stage, sliding of the lid relative to the box main body partially opens the opening. At the second stage, pivoting of the lid relative to the box main body fully opens the opening. The opening/closing mechanism implements the closing operation from a fully open state of the opening through a third stage and a subsequent fourth stage. At the third stage, pivoting of the lid relative to the box main body partially closes the opening. At the fourth stage, sliding of the lid relative to the box main body fully closes the opening. The first elastic member exerts elastic force for sliding the lid either at the first stage or the fourth stage. The second elastic member exerts elastic force for pivoting the lid at the second stage.

The present invention provides another improved storage box. The storage box includes a box main body having an opening, a lid for selectively opening and closing the opening, an opening/closing mechanism, a first elastic member, a second elastic member, a first accumulation mechanism, and a second accumulation mechanism. The opening/closing mechanism implements an opening operation and a closing operation of the lid with respect to the box main body. The opening/closing mechanism includes a base panel that is pivotally coupled to the box main body and slidably coupled to the lid. The opening/closing mechanism implements the opening operation from a fully closed state of the opening through a first stage and a subsequent second stage. At the first stage, the lid slides relative to the base panel so that the opening is partially opened. At the second stage, the lid pivots relative to the box main body together with the base panel so that the opening is fully opened. The opening/closing mechanism implements the closing operation from a fully open state of the opening through a third stage and a subsequent fourth stage. At the third stage, the lid pivots relative to the box main body together with the base panel in a direction opposite to the pivoting direction at the second stage so that the opening is partially closed. At the fourth stage, the lid slides relative to the base panel in a direction opposite to the sliding direction at the first stage so that the opening is fully closed. The first elastic member exerts elastic force for sliding the lid relative to the base panel at the fourth stage. The second elastic member exerts elastic force for pivoting the lid and the base panel relative to the box main body at the second stage. The first accumulation mechanism uses sliding of the lid relative to the base panel at the first stage for accumulating elastic force in the first elastic member. The second accumulation mechanism uses sliding of the lid relative to the base panel at the first stage for accumulating elastic force in the second elastic member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a storage box according to one embodiment of the present invention will be described with reference to the drawings. In this embodiment, the storage box is embodied as a vehicle console box 12. In the following, the traveling direction of the vehicle is referred to as forward direction. Also, unless specified otherwise, a vertical direction and a lateral direction are the same as the vertical direction and the lateral direction of the vehicle. When referring to rotation or a rotation direction, the direction is defined as viewed from the left side with respect to the advancing direction of the vehicle.

Figure 1:
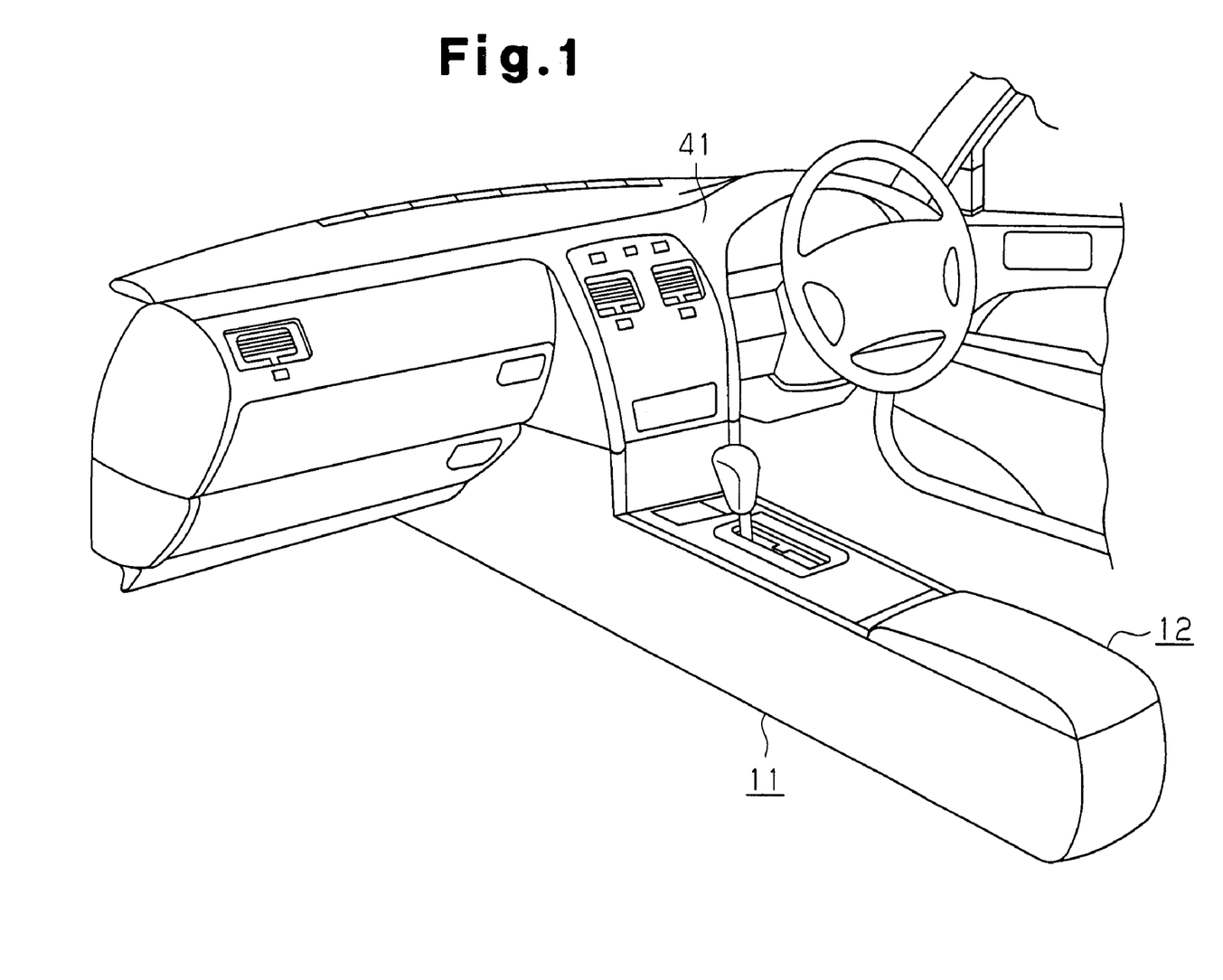
FIG. 1 is a perspective view illustrating a console and its surroundings in a passenger compartment.

As shown in FIG. 1, a console 11 is located on a floor panel between the driver's seat and the passenger seat in the passenger compartment of a vehicle. The console 11 extends from a front end to a center of the passenger compartment. The console 11 extends along the fore-and-aft direction of the vehicle. A shift lever is provided in a center of the upper surface of the console 11, and a storage box, which is the console box 12, is provided at the rear portion of the console 11.

Figure 2:
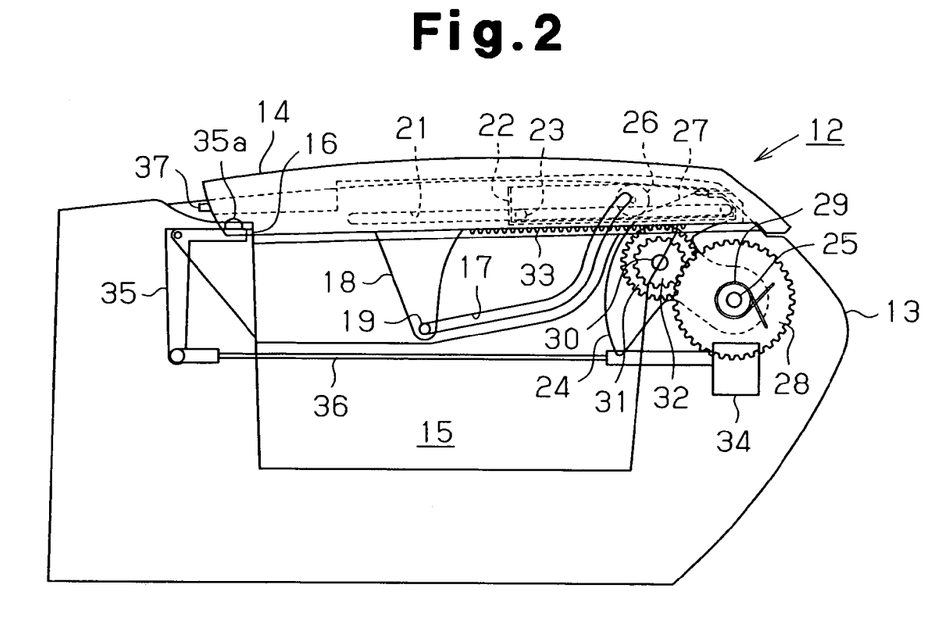
FIG. 2 is diagrammatic side view illustrating a console box according to a preferred embodiment.

As shown in FIG. 2, the console box 12 includes a substantially rectangular box main body 13 and a lid 14 provided at the top of the box main body 13. The lid 14 is formed as a substantially rectangular plate having a rectangular top and left and right side plates that extend downward from the left and right sides of the top. An accommodation space 15 is defined in the box main body 13. The accommodation space 15 is surrounded by a bottom wall, a front wall, side walls, and a rear wall. An opening 16 is formed at the upper end of the accommodation space 15. The lid 14 is provided to open and close the accommodation space 15, or the opening 16.

A guide groove 17 is formed in an upper portion of each side wall of the box main body 13. Each guide groove 17 extends from a center in the fore-and-aft direction to the rear end. From its front end to center, each guide groove 17 is inclined to ascend gradually. From its center, the guide groove 17 is bent upward so that it steeply ascends from its center to its rear end. An arm 18 is attached to the lower end of each side plate of the lid 14. Each arm 18 is shaped as an inverted triangle and extends downward. A guide pin 19 extends outward from a lower end portion of each arm 18. Each guide pin 19 is slidably engaged with the corresponding guide groove 17.

A slide groove 21 is formed on an inner surface of each side plate of the lid 14. Each slide groove 21 extends along the fore-and-aft direction. A rectangular base panel 22 is provided between the side plates of the lid 14. A pair of front and rear slide pins 23 extend from each sides of the base panel 22. Each pair of the slide pins 23 are slidably engaged with the corresponding slide groove 21 and permit the base panel 22 and the lid 14 to move relative to each other in the fore-and-aft direction. A T-shaped hinge plate 24 extends from the lower end of the base panel 22. The hinge plate 24 is secured to a side wall of the box main body 13 with a pivot shaft 25. The hinge plate 24 permits the base panel 22 to pivot upward and downward about the pivot shaft 25 relative to the box main body 13.

The guide grooves 17, the arms 18, the guide pins 19, the slide grooves 21, the base panel 22, the slide pin 23, the hinge plate 24, and the pivot shaft 25 form an opening/closing mechanism that open and close the lid 14 with respect to the box main body 13. The opening/closing mechanism defines the moving direction of the arms 18 by means of the guide grooves 17 and the guide pins 19 and moves the lid 14 with respect to the base panel 22, thereby sliding the lid 14 in the fore-and-aft direction relative to the box main body 13. The opening/closing mechanism defines the moving direction of the arms 18 by means of the guide grooves 17 and the guide pins 19 and moves the lid 14 together with the base panel 22, thereby pivoting the lid 14 in the vertical direction relative to the box main body 13.

Therefore, from the state in which the opening 16 is fully closed, the lid 14 operates to open the box main body 13 in first and second stages. In the first stage, the lid 14 is slid rearward to partially open the opening 16. In the second stage, the lid 14 is pivoted upward from the state of the first stage to fully open the opening 16. From the state in which the opening 16 is fully opened, the lid 14 operates to close the box main body 13 in third and fourth stages. In the third stage, the lid 14 is pivoted downward to partially close the opening 16. In the fourth stage, the lid 14 is slid from the state of the third stage to fully close the opening 16.

A drum 26 is rotatably supported at a center of the base panel 22. A first elastic member, which is a belt-like constant force spring 27, is wound about the drum 26. The front end of the constant force spring 27 is fixed to the drum 26, and the rear end of the constant force spring 27 is fixed to inner wall of the lid 14. As it is drawn out of the drum 26, the constant force spring 27 accumulates elastic force, and applies the elastic force to the lid 14 in a direction toward the drum 26. The base panel 22 and the drum 26 form a first accumulation mechanism. In the first stage, the first accumulation mechanism transmits force applied to the lid due to relative movement between the lid 14 and the base panel 22 to the constant force spring 27 via the base panel 22 and the drum 26, thereby accumulating elastic force in the constant force spring 27.

Figure 8A:
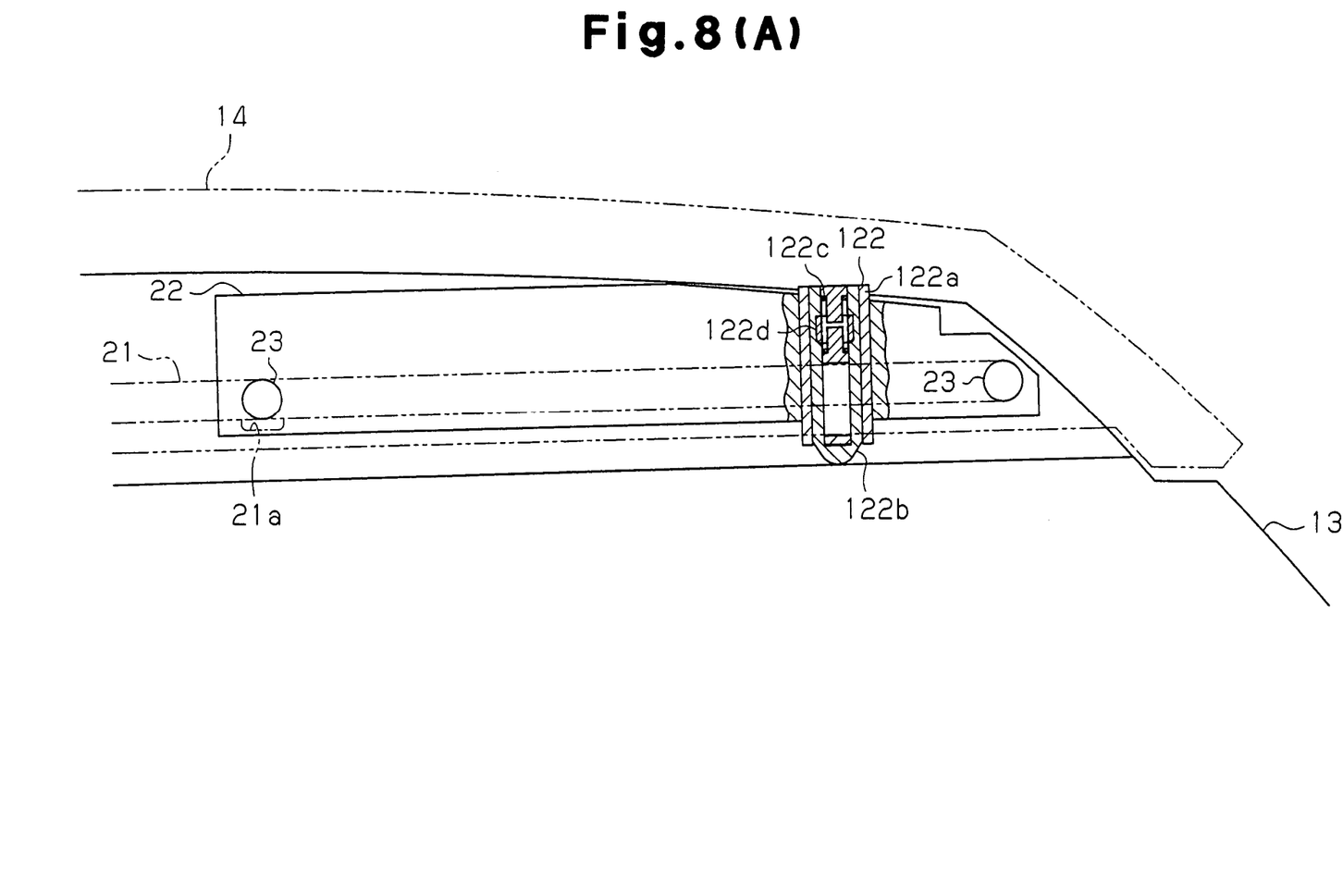
FIGS. 8(A) and 8(B) are enlarged partial cross-sectional side views illustrating a maintaining mechanism.
Figure 8B:
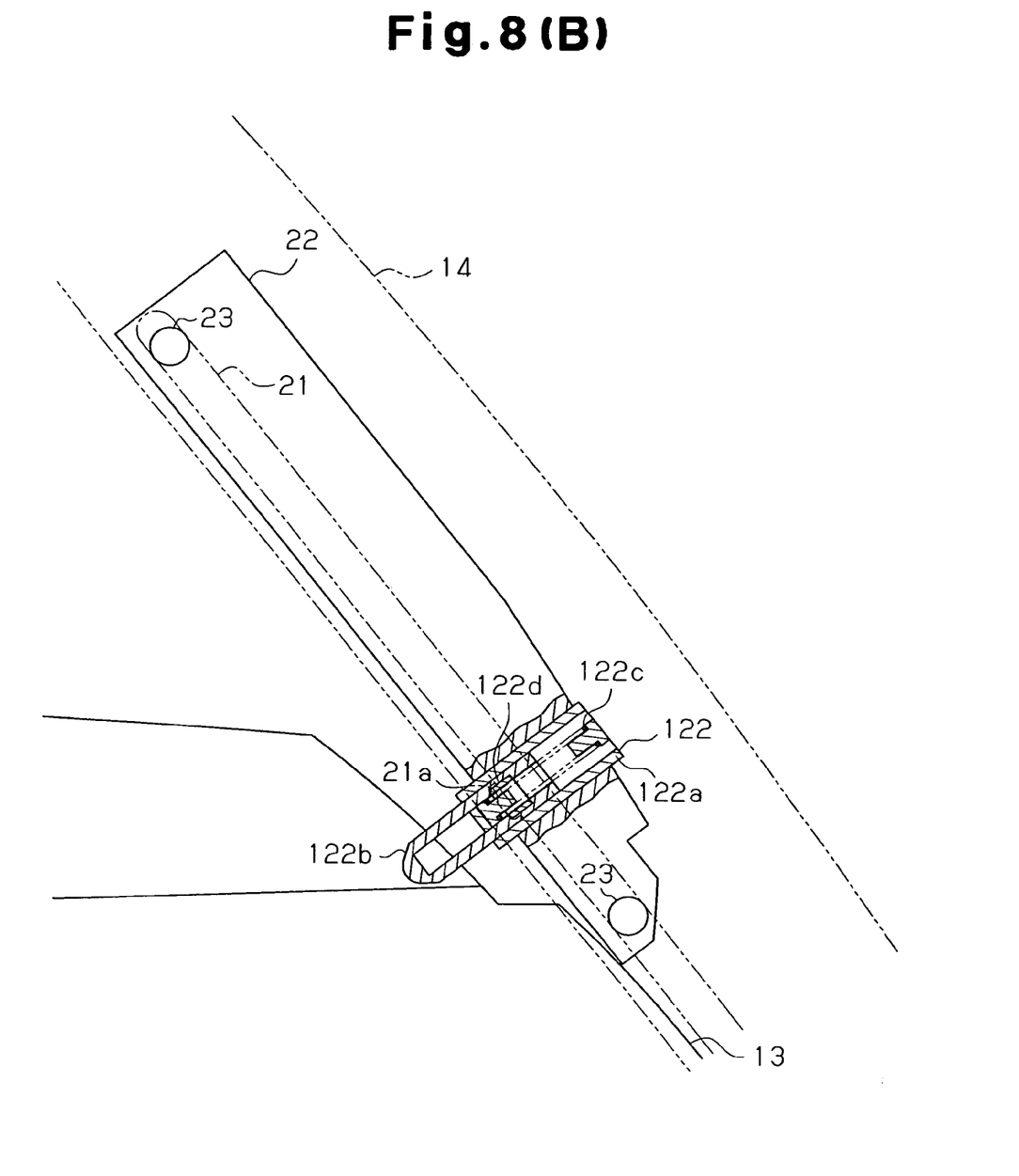

The console box 12 has a pair of left and right maintaining mechanisms that maintain a state in which the constant force spring 27 preserves the accumulated elastic force. In this embodiment, each maintaining mechanism is provided in one of the sidewalls of the base panel 22. As shown in FIGS. 8(A) and 8(B), each maintaining mechanism includes a locking device 122 located in the corresponding sidewall of the base panel 22 and a retainer recess 21a provided in the corresponding one of the slide grooves 21 of the lid 14. For the illustration purposes, FIGS. 8(A) and 8(B) only show one of the locking devices 122, the corresponding retainer recess 21a, and related components, and the other components are omitted from the drawings. The locking device 122 includes a guide member 122a provided in the sidewall of the base panel 22, a retainer pin 122b slidably supported by the guide member 122a, and a spring 122c that urges the retainer pin 122b downward. The retainer pin 122b has an engaging body 122d that is engageable with the retainer recess 21a.

In the first and fourth stages, each retainer pin 122b has its distal end contacting the upper side of the corresponding sidewall of the box main body 13 as shown in FIG. 8(A), and is located at a retreat position against the force of the spring 122c. In this state, the engaging bodies 122d are disengaged from the retainer recesses 21a, so that the lid 14 is movable relative to the base panel 22. At the second and third stages, each retainer pins 122b is moved to a retaining position and projects from the guide member 122a as shown in FIG. 8(B). In this state, the engaging bodies 122d are engaged with the retainer recesses 21a, so that the lid 14 does not move relative to the base panel 22. At the end of the first stage, the retainer pins 122b separate from the box main body 13 and thus move to the retaining position, where the retainer pins 122b engage with the retainer recesses 21a. At the beginning of the fourth stage, the retainer pins 122b contact the box main body, and thus move to the retreat position. That is, the retainer pins 122b separate from the retainer recesses 21a. Since relative movement between the lid 14 and the base panel 22 is restricted in the second stage and the third stage, the first accumulation mechanism maintains the constant force spring 27 with accumulated elastic force.

A pivot gear 28 is attached to the hinge plate 24 with the pivot shaft 25. The pivot gear 28 is rotatable relative to the hinge plate 24. A torsion coil spring 29 is provided on a side of the pivot gear 28. The torsion coil spring 29 functions as a second elastic member and surrounds the pivot shaft 25. One end of the torsion coil spring 29 is fixed to a wall surface of the box main body 13. The other end of the torsion coil spring 29 is fixed to the pivot gear 28. As the pivot gear 28 rotates counterclockwise as viewed in FIGS. 2 to 5, the torsion coil spring 29 of this embodiment accumulates elastic force that acts to rotate the pivot gear 28 clockwise.

A large auxiliary gear 31 and a small auxiliary gear 32 are attached to the hinge plate 24 with a rotary shaft 30. The diameter of the small auxiliary gear 32 is less than that of the large auxiliary gear 31. The small auxiliary gear 32 and the large auxiliary gear 31 rotate integrally relative to the hinge plate 24. A rack 33 is formed in the lower end of a side wall of the lid 14. The rack 33 is located rearward of the corresponding arm 18. The rack 33 is engaged with the large auxiliary gear 31. The small auxiliary gear 32 is engaged with the pivot gear 28.

The pivot gear 28, the large auxiliary gear 31, the small auxiliary gear 32, and the rack 33 form a second accumulation mechanism. In the first stage, the second accumulation mechanism transmits force applied to the lid due to relative movement between the lid 14 and the base panel 22 to the torsion coil spring 29 through the rack 33, the large auxiliary gear 31, the small auxiliary gear 32, and the pivot gear 28, so that elastic force is accumulated in the torsion coil spring 29.

When relative movement between the lid 14 and the base panel 22 is restricted by the retainer pins 122b and the retainer recesses 21a at the second stage, rotation of the large auxiliary gear 31 and the small auxiliary gear 32 relative to the hinge plate 24 about the rotary shaft 30 is restricted. When prevented from rotating about their axis, the large auxiliary gear 31 and the small auxiliary gear 32 are permitted to move about the pivot shaft 25 of the pivot gear 28 (revolution). When permitted to revolve, the large auxiliary gear 31 and the small auxiliary gear 32 transmit elastic force from the torsion coil spring 29 to the hinge plate 24 via the pivot gear 28, thereby pivoting the lid 14.

The lid 14 has a weight (not shown) in a front end portion. Downward pivoting of the lid 14 from the third stage, that is, from the state in which the opening 16 is fully opened, is executed by the weight, or by urging force generated by the self weight of the lid 14. The elastic force accumulated in the torsion coil spring 29 by the second accumulation mechanism is greater than the urging force due to the self weight of the lid 14.

The console box 12 has a lid locking mechanism, which holds the lid 14 in a state to fully open the opening 16 against the urging force of the self weight of the lid 14. The lid locking mechanism includes a locking member 34 and a manipulation member 35 for manipulating the locking member 34. The locking member 34 is located in the vicinity of the pivot shaft 25 and adjacent to the pivot gear 28. The locking member 34 restricts pivoting of the lid 14 against the urging force of the self weight of the lid 14. The locking member 34 cannot resist the elastic force accumulated in the torsion coil spring 29 by the second accumulation mechanism, and permits the lid 14 to be pivoted by the elastic force.

The manipulation member 35 is L-shaped and has a release button 35a provided at the upper end. The manipulation member 35 is pivotally attached to the inner structure of the box main body 13 such that the release button 35a is exposed in the console box 12, which forms a part of the console 11 and is located forward of the opening 16. That is, the manipulation member 35 is located away from the locking member 34. The lower end of the manipulation member 35 is connected to the locking member 34 with a wire 36. When the release button 35a is pressed, the manipulation member 35 is pivoted clockwise and the wire 36 is pulled forward. Accordingly, the locking member 34 releases the pivot gear 28 so that the pivot gear 28 can rotate. This permits the lid 14 to pivot downward by the self weight.

A close lock release button 37 is provided at the front end of the lid 14. In a state where the lid 14 fully closes the opening 16, the lid 14 is locked by a close locking member (not shown). The close lock release button 37 is provided to cause the close locking member to release the lid 14.

Operations of the lid 14 of the console box 12 to open and close the opening 16 will now be described.

Figure 3:
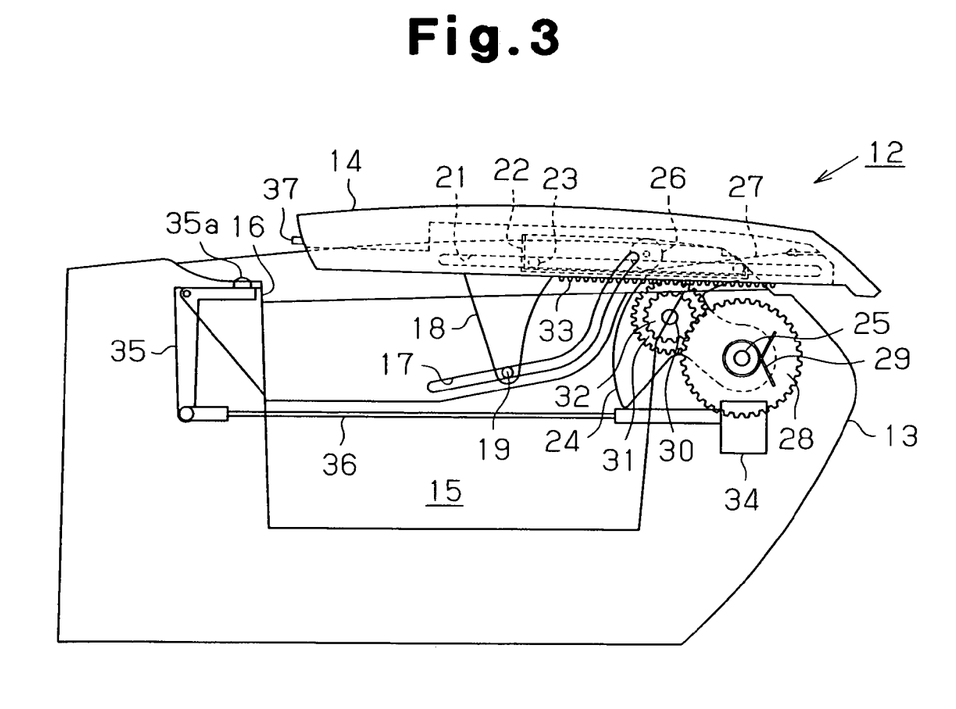
FIG. 3 is a diagrammatic side view showing a first stage and a fourth stage of movement of the lid in the consol box shown in FIG. 2.

First, the operation of the lid 14 for opening the box main body 13 will be described. To cause the lid 14 to start the opening operation, the close lock release button 37 is pressed to unlock the lid 14. Then, the occupant (operator) manually performs the first stage of the opening operation as shown in FIGS. 2 and 3. At the first stage, the lid 14 is guided to slide rearward by the guide pins 19 and guide grooves 17, and the slide groove 21 and slide pins 23. Accordingly, the lid 14 is slid relative to the box main body 13 and the base panel 22. At this time, the rear end of the constant force spring 27 is drawn out of the drum 26 by the force applied to the lid 14, so that elastic force is accumulated in the constant force spring 27. In the box main body 13, the force applied to the lid 14 causes the rack 33 to rotate the large auxiliary gear 31 and the small auxiliary gear 32 clockwise. The small auxiliary gear 32, in turn, rotates the pivot gear 28 counterclockwise, so that elastic force is accumulated in the torsion coil spring 29.

Figure 4:
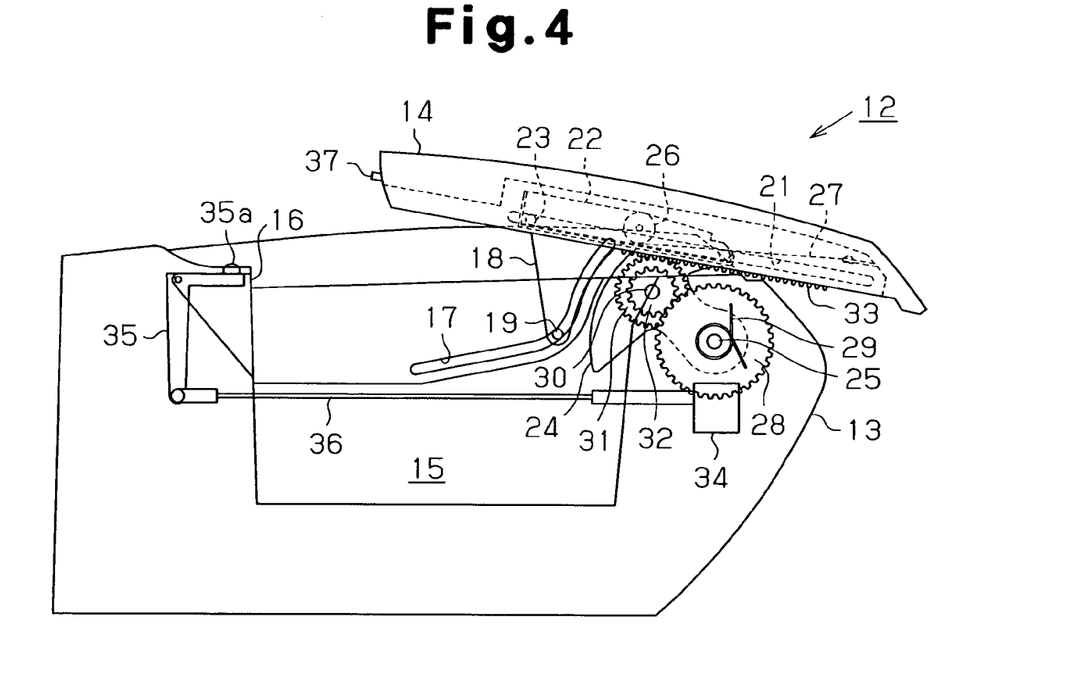
FIG. 4 is a diagrammatic side view showing a first stage and a fourth stage of movement of the lid in the consol box shown in FIG. 2.

Subsequently, as shown in FIG. 4, the lid 14 is slid rearward until the guide pins 19 reach the center of the guide grooves 17, so that the opening 16 of the accommodation space 15 of the console box 12 is partially open. The first stage of the opening operation is thus completed. At this time, the retainer pins 122b and the retainer recesses 21a cause the base panel 22 to be engaged with the lid 14, so that the constant force spring 27 is maintained with the accumulated elastic force. Also, the counterclockwise rotation of the pivot gear 28 sufficiently accumulates elastic force in the torsion coil spring 29.

Figure 5:
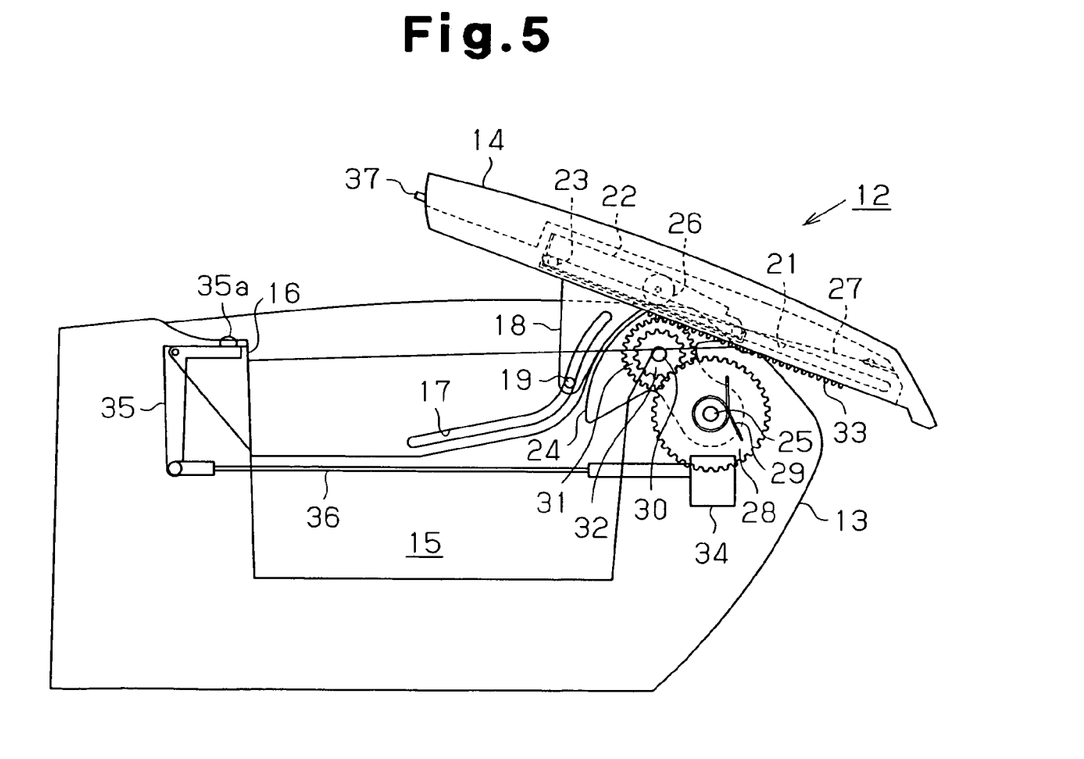
FIG. 5 is a diagrammatic side view showing a second stage of movement of the lid.
Figure 6:
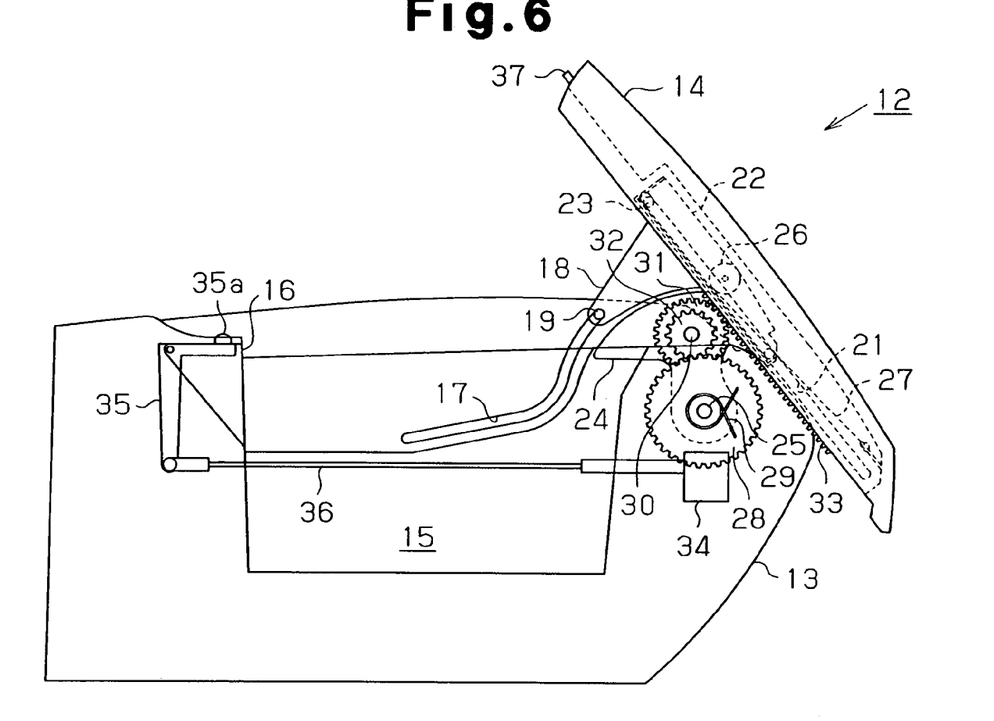
FIG. 6 is a diagrammatic side view showing a second stage of movement of the lid.

Next, the second stage of the opening operation is performed. Since the base panel 22 is locked to the lid 14 by means of the retainer pins 122b and the retainer recesses 21a at the end of the first stage, the small auxiliary gear 32 and the large auxiliary gear 31 are prevented from rotating about their axis, and permitted to revolve in accordance with rotation of the pivot gear 28. When the occupant (operator) releases the lid 14 at the second stage, the elastic force accumulated in the torsion coil spring 29 causes the pivot gear 28 to rotate clockwise as shown in FIG. 5. Accordingly, the small auxiliary gear 32 and the large auxiliary gear 31 revolve as shown in FIG. 6. Then, the lid 14 is pivoted clockwise and upward together with the base panel 22, while being guided by the guide pins 19 and the guide grooves 17. When the guide pins 19 reach the rear end of the guide grooves 17, the pivoting motion of the lid 14 is restricted by the locking member 34. The second stage is thus completed. When the second stage is completed, the opening 16 is fully opened, and the lid 14 is held while being inclined forward. Therefore, articles can be put in or taken out of the accommodation space 15 through the opening 16.

Figure 7:
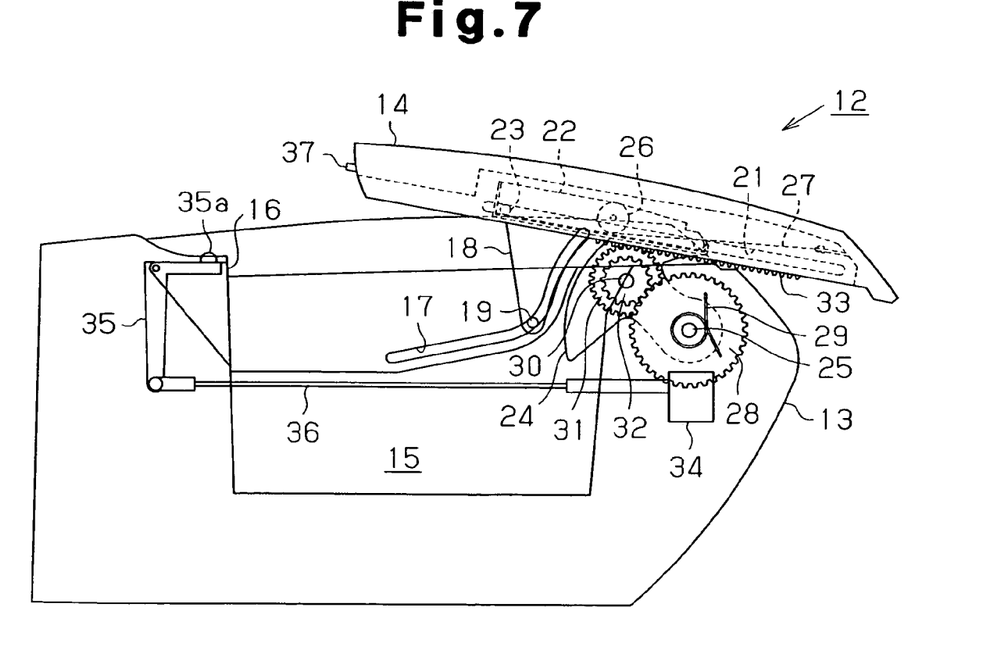
FIG. 7 is a diagrammatic side view showing a third stage of movement of the lid.

Next, the operation of the lid 14 for closing the box main body 13 will be described. To cause the lid 14 to start the closing operation, the occupant (operator) only has to press the release button 35a. That is, when the release button 35a is pressed, the locking member 34 permits the lid 14 to pivot, so that the lid 14 starts pivoting forward by its own weight as shown in FIG. 7. The third stage of the closing operation is thus started. At the third stage, the lid 14 is guided by the guide pins 19 and the guide grooves 17 and pivots counterclockwise. As the lid 14 pivots, the pivot gear 28 rotates counterclockwise. Accordingly, the large auxiliary gear 31 and the small auxiliary gear 32 revolve. When the guide pins 19 reach the center of the guide grooves 17, the opening 16 is partially closed. The third stage is thus completed.

At the end of the third stage, the retainer pins 122b are disengaged from the retainer recesses 21a, which releases the base panel 22 from the lid 14. Accordingly, the closing operation enters the fourth stage. At the fourth stage, since the retainer pins 122b are disengaged from the retainer recesses 21a, the constant force spring 27 is wound about the drum 26 by its elastic force. At this time, the lid 14 is pulled by the elastic force of the constant force spring 27 while being guided by the slide grooves 21 and slide pins 23, and the guide pins 19 and guide grooves 17. The lid 14 is therefore slid forward relative to the base panel 22 and the box main body 13. Then, when the guide pins 19 reach the front end of the guide grooves 17 as shown in FIG. 2 after the lid 14 is slid, the lid 14 fully closes the opening 16. The fourth stage is thus completed. In this state, the close locking member locks the lid 14.

The above embodiment has the advantages described below.

The opening and closing operations of the second to fourth stages are automatically performed only by manually performing the first stage. That is, by sliding of the lid 14 at first stage, the elastic force of the constant force spring 27, that is used to slide the lid 14 at the fourth stage, and elastic force of the torsion coil spring 29 to pivot the lid 14 at the second stage are accumulated. Pivoting motion of the lid at the third stage is performed by the self weight of the lid 14. Accordingly, the opening and closing operations of the lid 14 are facilitated without using electricity.

Since the opening and closing operations are performed as the lid 14 is slid and pivoted, the space required for the opening and closing operations of the lid 14 is reduced compared to the case where the operations are performed only by sliding or pivoting the lid 14. Also, the distance by which the lid 14 is slid at the first stage is shortened. Further, although no electricity is needed for the opening and closing operations, the console box 12 is easy to operate. Also, the sliding distance is relatively short and space for sliding and pivoting motions is small, which further improves the usability.

The retainer pins 122b and the retainer recesses 21a permit elastic force to be accumulated in the constant force spring 27 at the first stage. Therefore, at the fourth stage, which is a closing operation after the first stage, the accumulated elastic force is released at an appropriate timing and causes the lid 14 to start the closing operation. The lid 14 thus starts the closing operation without being manipulated.

The retainer pins 122b and the retainer recesses 21a prevent rotation of the large auxiliary gear 31 and the small auxiliary gear 32, while permitting the gears 31, 32 to revolve as the pivot gear 28 rotates. Therefore, the elastic force of the torsion coil spring 29 is effectively used as force for pivoting the lid 14 at the second stage.

Since the locking member 34 holds the lid 14 in a state where the opening 16 is fully open, articles can be easily put in and taken out of the accommodation space 15.

The locking state of the pivot gear 28 caused by the locking member 34 located at the rear end of the box main body 13 is released by pressing the release button 35a located at the front end of the box main body 13. That is, the locking state of the pivot gear 28 caused by the locking member 34 can be remotely released by manipulating the manipulation member 35 located close to the occupant. Therefore, the operator can easily close the lid 14 without twisting the torso or shoulder.

The above embodiment may be modified as follows.

The sliding motion of the lid 14 at first stage may be carried out by the elastic force of the constant force spring 27. In this case, the sliding motion of the lid 14 at the fourth stage is carried out manually, the elastic force of the constant force spring 27 is accumulated by the sliding motion of the lid 14 at the fourth stage.

The first elastic member or the second elastic member may be formed of elastic bodies such as synthetic rubber or spring members such as compression springs and leaf springs.

The manipulation member 35 may be provided in the locking member 34. The manipulation member 35 may be located on an instrument panel 41 (see FIG. 1) in the passenger compartment. Alternatively, the manipulation member 35 may be provided in any area of the console 11 other than the area in the vicinity of the opening 16 of the console box 12.

The lid 14 may be configured not to be pivoted by the self weight at the third stage. In this case, the lid 14 is manually pivoted at the third stage. In this case, the lid locking means may be omitted.

As long as the maintaining mechanisms are capable of maintaining the accumulated elastic force of the first elastic member from the end of the first stage to the beginning of the fourth stage, the maintaining mechanisms may have components other than the retainer pins 122b and the retainer recesses 21a. Alternatively, the maintaining mechanisms may be omitted.

The accumulation mechanisms may be different from those disclosed in the illustrated embodiment as long as the accumulation mechanisms are capable of transmitting the force applied to the lid 14 by the sliding motion at the first stage to the first elastic member and the second elastic member, and of accumulating elastic force in the first elastic member and the second elastic member.

The present invention is not limited to the console box 12, but may be applied to a rear console box provided in the rear seat of a vehicle.

The present examples and embodiments are to be considered as illustrative and not restrictive, and the invention is not to be limited to the details given herein, but may be modified within the scope and equivalence of the appended claims.

The invention claimed is:

1. A storage box comprising:
   a box main body having an opening;
   a lid for selectively opening and closing the opening;
   an opening/closing mechanism that implements an opening operation and a closing operation of the lid with respect to the box main body, wherein the opening/closing mechanism implements the opening operation from a fully closed state of the opening through a first stage and a subsequent second stage, wherein, at the first stage, sliding of the lid relative to the box main body partially opens the opening, wherein, at the second stage, pivoting of the lid relative to the box main body fully opens the opening, wherein the opening/closing mechanism implements the closing operation from a fully open state of the opening through a third stage and a subsequent fourth stage, wherein, at the third stage, pivoting of the lid relative to the box main body partially closes the opening, and wherein, at the fourth stage, sliding of the lid relative to the box main body fully closes the opening;
   a first elastic member that exerts elastic force for sliding the lid either at the first stage or the fourth stage; and
   a second elastic member that exerts elastic force for pivoting the lid at the second stage.

2. The storage box according to claim 1, further comprising a first accumulation mechanism and a second accumulation mechanism, wherein the first accumulation mechanism transmits force that is applied to the lid for sliding the lid at the first stage to the first elastic member, thereby accumulating elastic force in the first elastic member, wherein, at the fourth stage, the first elastic member slides the lid with the accumulated elastic force, and wherein the second accumulation mechanism transmits the force applied to the lid at the first stage to the second elastic member, thereby accumulating elastic force in the second elastic member.

3. The storage box according to claim 2, further comprising a maintaining mechanism that maintains a state in which the first elastic member preserves the accumulated elastic force from the end of the first stage to the beginning of the fourth stage.

4. The storage box according to claim 1, wherein the opening/closing mechanism causes the lid to pivot by the self weight of the lid at the third stage, the storage box further comprising a lid locking mechanism that holds the lid in a state to fully open the opening.

5. The storage box according to claim 4, wherein the storage box is mounted on a vehicle that has a console and an instrument panel, the storage box being incorporated in the console, wherein the lid locking mechanism includes a locking member for restricting or permitting pivoting of the lid by the self weight, and a manipulation member for manipulating the locking mechanism, the locking member being located in the vicinity of a pivot shaft of the lid, and the manipulation member being located on the console or the instrument panel in an area that is forward of the opening in the vehicle.

6. A storage box comprising:
   a box main body having an opening;
   a lid for selectively opening and closing the opening;
   an opening/closing mechanism that implements an opening operation and a closing operation of the lid with respect to the box main body, the opening/closing mechanism including a base panel that is pivotally coupled to the box main body and slidably coupled to the lid, wherein the opening/closing mechanism implements the opening operation from a fully closed state of the opening through a first stage and a subsequent second stage, wherein, at the first stage, the lid slides relative to the base panel so that the opening is partially opened, wherein, at the second stage, the lid pivots relative to the box main body together with the base panel so that the opening is fully opened, wherein the opening/closing mechanism implements the closing operation from a fully open state of the opening through a third stage and a subsequent fourth stage, wherein, at the third stage, the lid pivots relative to the box main body together with the base panel in a direction opposite to the pivoting direction at the second stage so that the opening is partially closed, and wherein, at the fourth stage, the lid slides relative to the base panel in a direction opposite to the sliding direction at the first stage so that the opening is fully closed;
   a first elastic member that exerts elastic force for sliding the lid relative to the base panel at the fourth stage;
   a second elastic member that exerts elastic force for pivoting the lid and the base panel relative to the box main body at the second stage;
   a first accumulation mechanism that uses sliding of the lid relative to the base panel at the first stage for accumulating elastic force in the first elastic member; and
   a second accumulation mechanism that uses sliding of the lid relative to the base panel at the first stage for accumulating elastic force in the second elastic member.

7. The storage box according to claim 6, further comprising a maintaining mechanism that maintains a state in which the first elastic member preserves the accumulated elastic force from the end of the first stage to the beginning of the fourth stage.

8. The storage box according to claim 7, wherein the maintaining mechanism restricts movement of the lid relative to the base panel, thereby maintaining the position of the lid relative to the base panel at the end of the first stage.

9. The storage box according to claim 6, wherein the opening/closing mechanism causes the lid to pivot by the self weight of the lid at the third stage, the storage box further comprising a lid locking mechanism that holds the lid in a state to fully open the opening.

10. The storage box according to claim 9, wherein the storage box is mounted on a vehicle that has a console and an instrument panel, the storage box being incorporated in the console, wherein the lid locking mechanism includes a locking member for restricting or permitting pivoting of the lid by the self weight, and a manipulation member for manipulating the locking mechanism, the locking member being located in the vicinity of a pivot shaft of the lid, and the manipulation member being located on the console or the instrument panel in an area that is forward of the opening in the vehicle.

* * * * *